(12) United States Patent
Lamik-Thonhauser et al.

(10) Patent No.: US 10,107,049 B2
(45) Date of Patent: Oct. 23, 2018

(54) DRILL PIPE

(71) Applicant: THINK AND VISION GMBH, Vienna (AT)

(72) Inventors: Bouchra Lamik-Thonhauser, Gai (AT); Anton Scheibelmasser, Graz (AT); Anton Kotov, Samara (RU); Alexander Fine, Leoben (AT); Manfred Gutschelhofer, Langenwang (AT); Johann Jud, Kindberg (AT); Florian Aichinger, Pasching (AT)

(73) Assignee: THINK AND VISION GMBH, Leoben (AT)

( * ) Notice: Subject to any disclaimer, the term of this patent is extended or adjusted under 35 U.S.C. 154(b) by 187 days.

(21) Appl. No.: 14/781,772

(22) PCT Filed: Mar. 27, 2014

(86) PCT No.: PCT/AT2014/000063
§ 371 (c)(1),
(2) Date: Oct. 1, 2015

(87) PCT Pub. No.: WO2014/172720
PCT Pub. Date: Oct. 30, 2014

(65) Prior Publication Data
US 2016/0024855 A1    Jan. 28, 2016

(30) Foreign Application Priority Data

Apr. 22, 2013  (AT) .................................. A 336/2013

(51) Int. Cl.
| E21B 17/00 | (2006.01) |
| E21B 17/02 | (2006.01) |
| E21B 17/042 | (2006.01) |

(52) U.S. Cl.
CPC ............ *E21B 17/042* (2013.01); *E21B 17/00* (2013.01); *E21B 17/003* (2013.01); *E21B 17/028* (2013.01)

(58) Field of Classification Search
CPC ........ E21B 17/00; E21B 17/03; E21B 17/028; E21B 17/02; E21B 17/042; E21B 17/003
See application file for complete search history.

(56) References Cited

U.S. PATENT DOCUMENTS

| 4,012,061 A | 3/1977 | Olson |
| 4,953,636 A | 9/1990 | Mohn |

(Continued)

FOREIGN PATENT DOCUMENTS

| AT | 508 272 B1 | 1/2011 |
| WO | 95/17575 A1 | 6/1995 |

(Continued)

OTHER PUBLICATIONS

International Search Report, dated Dec. 22, 2014, from corresponding PCT application.

*Primary Examiner* — Taras P Bemko
*Assistant Examiner* — Dany E Akakpo
(74) *Attorney, Agent, or Firm* — Young & Thompson

(57) ABSTRACT

A drill pipe, particularly for a drill string, having an outer and an inner pipe (3), a female connector (4) with an internal thread at one end of the drill pipe (1), and a male connector (5) with an external thread at the end opposite from the female connector (4), wherein the inner pipe (3) is arranged substantially concentrically in the outer pipe (2) and the drill pipe (1) has a center region (8) with an internal diameter. The outer pipe (2) has an inwardly thickened wall portion at an end region (7) on the male connector side, having a smaller internal diameter than the internal diameter of the center region (8), and the internal diameter of the outer pipe (2) remains substantially the same at an end region (6) on the (Continued)

female connector side in relation to the internal diameter of the center region (8).

13 Claims, 3 Drawing Sheets

(56) References Cited

U.S. PATENT DOCUMENTS

| | | |
|---|---|---|
| 4,997,048 A | 3/1991 | Vam |
| 6,670,880 B1 * | 12/2003 | Hall ............... E21B 17/028 336/132 |
| 2008/0041575 A1 | 2/2008 | Clark et al. |
| 2011/0217861 A1 | 9/2011 | Scheibelmasser et al. |
| 2014/0085099 A1 * | 3/2014 | Menezes ............ E21B 17/028 340/855.1 |

FOREIGN PATENT DOCUMENTS

| | | |
|---|---|---|
| WO | 03/001023 A1 | 1/2003 |
| WO | 2012/045698 A1 | 4/2012 |

* cited by examiner

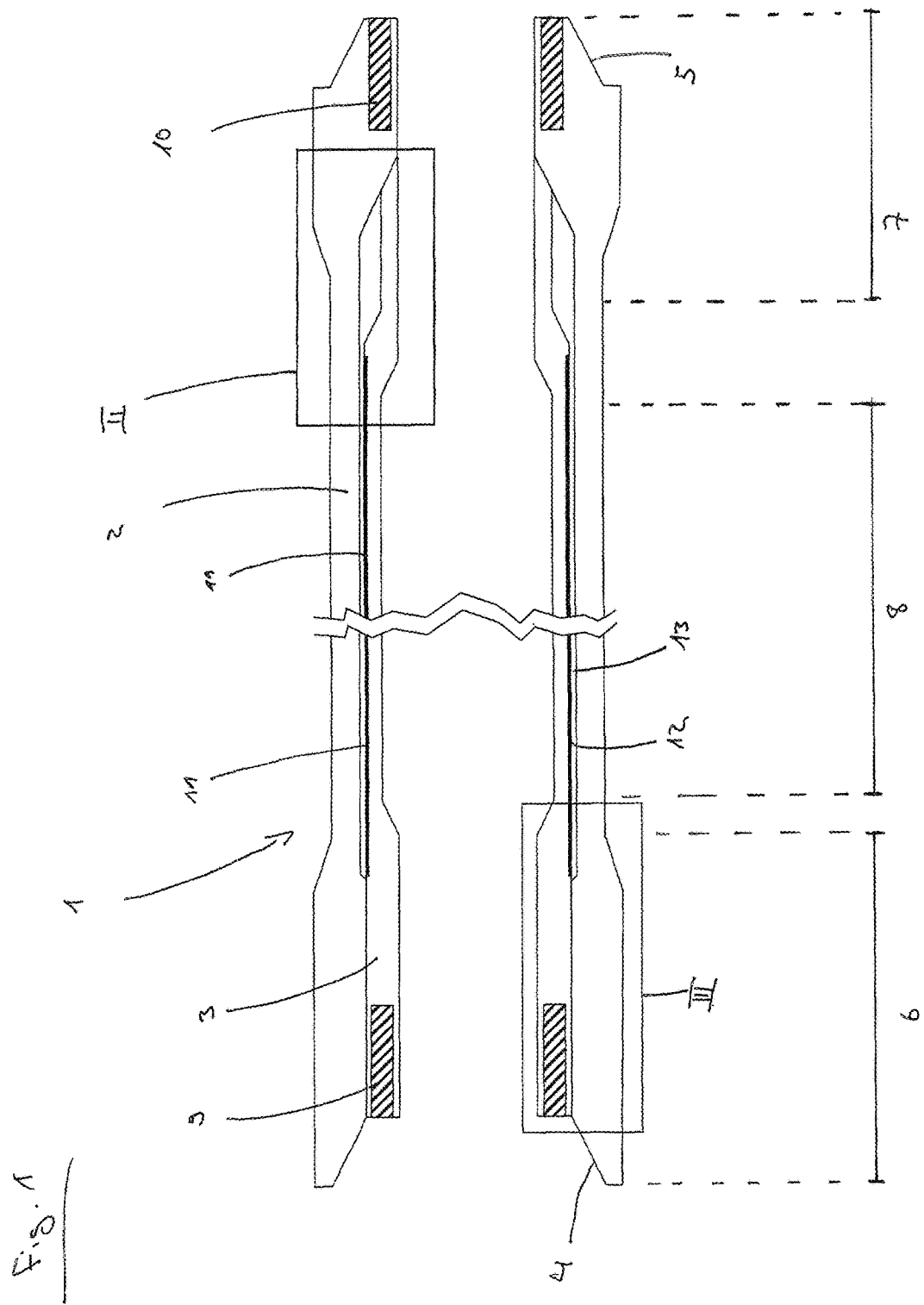

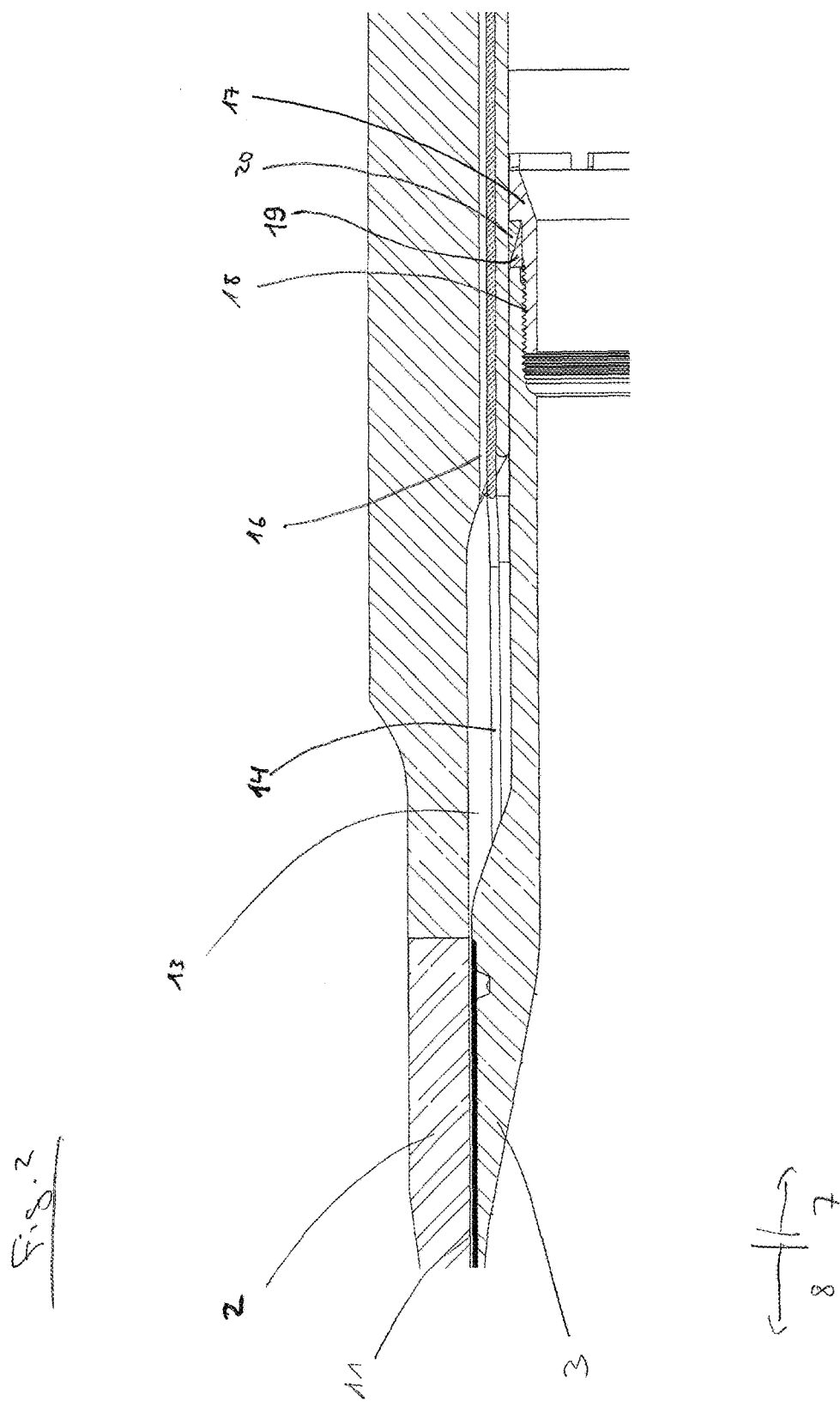

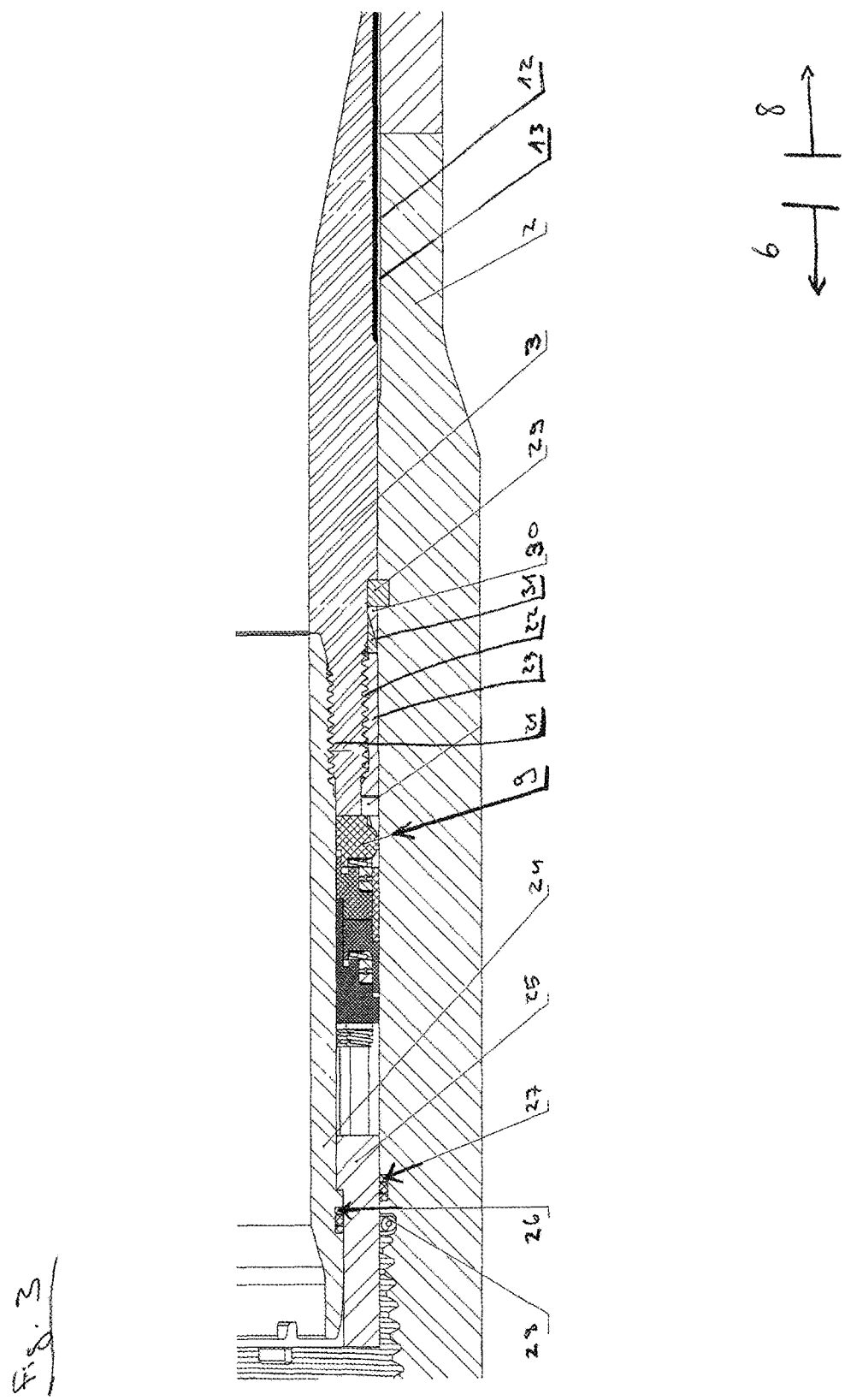

DRILL PIPE

BACKGROUND OF THE INVENTION

Field of the Invention

The invention relates to a drill pipe, in particular for a drill string, with an outer pipe and an inner pipe, a female connector with an internal thread on one end of the drill pipe and a male connector with an external thread on the end opposite to the female connector, whereby the inner pipe is arranged essentially concentrically in the outer pipe and whereby the drill pipe has a center region with an inner diameter.

Description of the Related Art

In the case of modern drilling, for example for crude oil, natural gas, or for exploiting geothermics, there are three essential aims in the configuration of drill strings, which aims are in conflict with one another. Thus, it is desirable to provide drill strings with large inner diameters in order to achieve as low a pressure loss as possible for the drilling fluid (mud). At the same time, it is important in terms of safety but also in terms of efficiency to be informed as precisely as possible on the conditions at the end of the drill string. For this purpose, measuring systems and means are required for transferring measuring data in a manner that is as loss-free and as ideally high-frequency as possible and also for handling measuring systems with energy in as loss-free a manner as possible. The space required for electronics and/or wiring often comes at the expense of throughput. The requirement for especially secure and durable drill strings hampers these two aims, since primarily greater wall thicknesses correspond to this requirement.

In order to meet the criteria of stability and throughput in the state of the art, the regions of the drill rod that are exposed to special stresses, such as the female and male connectors, with which individual drill pipes of the drill string are connected, and the transitions from the latter to the center regions of the drill pipes are configured more solidly. To this end, the pipes have thickenings of the wall thicknesses inward (internal upset) and/or outward (external upset). These thickenings usually decrease uniformly toward the center region of the drill pipe in order to provide a transition that has the property of being especially gentle on materials between the fairly bendable center region and the stiff female and male connectors. This compromise between throughput and stability does not take into consideration, however, the aim for as much information as possible regarding the state of the drilling.

SUMMARY OF THE INVENTION

The purpose of the invention is therefore to make available a drill pipe that minimizes pressure losses, is stable, and in this case is suitable for a data and energy transfer that is as loss-free as possible.

This object is achieved by a drill pipe of the above-mentioned type, which is characterized in that the outer pipe, on an end region on the male connector side, has a thickening of the wall thickness inward with a smaller inner diameter relative to the inner diameter of the center region and in that the inner diameter of the outer pipe remains essentially the same on an end region on the female connector side relative to the inner diameter of the center region.

Thus, an inner pipe, which has wiring and/or electronics on its outer side, can be inserted, by which a protected region for the wiring and/or electronics is provided.

Usually, drill pipes for drill strings are configured symmetrically. If a pipe has a thickening of the wall thickness inward, an internal upset, on one end, then it also has a similar internal upset on the opposite end. A drill pipe that has an internal upset on the end region on the male connector side (pin side) and that has no internal upset on the opposite end region on the female connector side (box side) is, in contrast, completely atypical. The advantage of such a design lies in the possibility of configuring the inner pipe in such a way that it—since it usually is brought from one side into the outer pipe in comparison to the designs that have a thickening of the wall thickness inward on two sides—can be configured with a very much larger outer diameter. Consequently, the inner diameter of the inner pipe can also be configured considerably larger, which has a positive effect on a minimization of pressure losses of the drilling fluid.

In a preferred embodiment of the invention, the inner pipe in an end region on the female connector side has a thickening of the wall thickness inward. This is advantageous since between two drill pipes, which usually are connected via box and pin (i.e., female connector and male connector) in order to form the drill string, a continuous transition can be produced. This advantage is greater when, as according to a preferred embodiment of the invention, the inner diameter of the inner pipe in the region of the thickening on the female connector side inward corresponds essentially to the inner diameter of the outer pipe in the region of the thickening on the male connector side inward.

According to another preferred embodiment, the outer pipe on both ends has a thickening of the wall thickness outward. Because of this further increase in stability in the form of an external upset, the internal upset, i.e., the thickening of the wall thickness inward, can be made less strongly pronounced, which once more has a positive effect on the throughput of the drilling fluid or jetting liquid because of the enlarged inner diameter.

According to an especially preferred embodiment of the invention, the inner pipe has at least one strip conductor, preferably two strip conductors, at least in places on its outer side. In the state of the art, when an inner pipe is used, strip conductors or conductors are usually arranged between the inner pipe and the outer pipe. In this case, however, both in the manufacturing and in the later use of the drill pipe in a drill string, there is the risk that the conductors will become damaged by vibration, expansion, and other environmental influences that are common in a drilling environment. If the conductors, however, are arranged directly on the inner pipe, preferably in the form of flat conductors applied by evaporation coating on the inner pipe or embedded in the inner pipe, the latter are significantly better protected by the inner pipe.

This effect is further intensified when, as proposed according to a preferred embodiment of the invention, the inner pipe is separated from the outer pipe at least in places and in this case forms a ring-shaped cavity. This cavity preferably extends essentially over the entire center region of the pipe, i.e., over the sections in which no threaded pieces or thickenings or upsets are located. As a result, the conductors are decoupled from the outer pipe over a significant part of their runs and thus are exposed to fewer potentially harmful environmental influences. For this purpose, a few millimeters are sufficient. The separation therefore has no significant influence on the interior space geometry and stiffness of the drill pipe per se.

In this case, the cavity can acquire greater value by holding, as according to further preferred embodiments of the invention, a filler, data media, and/or sensors. Thus, for example, silicone oils or air can improve the lifting force, while sand, rubber, granulates, polymers, resins or else fiber composite materials can damp oscillations of the drill rod. Data media can carry information on the identity of the drill pipe, its last maintenance and the like, or record data detected by sensors, such as, for example, pressure, vibration, or temperature. To this end, it is useful when the data medium or media or the sensor or sensors is/are connected to the conductors at least at times in order also to be able to read out in the assembled state of the drill pipe.

For all applications and designs of the cavity, it is especially preferred when the latter is sealed relative to the environment and the interior space of the drill pipe. A complete pressure-, water-, dust- and explosion-proof seal is in this case especially preferred.

BRIEF DESCRIPTION OF THE DRAWING FIGURES

An embodiment of the invention is explained in more detail below based on the drawing. Here:

FIG. 1 shows a greatly simplified sketch of a drill pipe according to the invention, FIG. 2 shows a first detail of FIG. 1, and FIG. 3 shows a second detail of FIG. 1.

DETAILED DESCRIPTION OF THE INVENTION

FIG. 1 shows a greatly simplified sketch of a drill pipe 1 according to the invention with an outer pipe 2 and an inner pipe 3. In a way that is known in the art, the drill pipe has a female connector 4 with an internal thread (not shown) and a male connector 5 with an external thread (not shown). In this case, an end region on the female connector side forms the box region 6, and an end region on the male connector side forms the pin region 7. A center region 8 extends between these two. The pin region 7, the center region 8, and the box region 6 can be manufactured integrally, i.e., in one part, or in multiple parts, for example welded (e.g., by abrasive welding), glued, or screwed.

In this case, the depicted wall thickness of the inner pipe 3 is used only for illustration. In reality, the goal is that the difference between the inner diameter of the outer pipe 2 and the inner diameter of the inner pipe 3 be as small as possible. The inner diameter of the inner pipe 3 preferably deviates only slightly, preferably not more than 10%, from the inner diameter of the outer pipe 2.

In this embodiment, female and male connectors 4, 5 in each case have a device 9, 10 for producing a galvanically-conducting connection to the drill pipe 1 of the drill string that is adjacent in each case. How such a device can be configured is disclosed in, for example, AT 508 272 B1. In addition, the inner pipe in the depicted embodiment has two strip conductors 11, 12, which in this embodiment are embedded in the inner pipe 3. A cavity 13 is located between the outer pipe 2 and the inner pipe 3.

FIG. 2 shows a first detail of FIG. 1 in the region of the transition from the center region 8 to the pin region 7. The strip conductor 11 on the outer side of the inner pipe 3 is connected with a conductor 14, which runs through the cavity 13 that is enlarged in this region and in a separate conductor channel 16 further to the device 10 for the production of a galvanically-conducting connection with a follow-on drill pipe.

In addition, FIG. 2 shows a mounting ring 17. The latter is connected to the outer pipe 2 by friction in the depicted embodiment. Embodiments in which the mounting ring 17 is connected differently, for example, integrally by welding, to the outer pipe 2 are also conceivable. The mounting ring 17 has a thread 18. Via this thread 18, the inner pipe 3, after it was brought from the box side into the outer pipe 2, can be connected indirectly to the outer pipe 2 and can be positioned relative to the outer pipe 2. The simple mounting of the wiring before connection is done is the advantage of such an indirect connection between the outer pipe and the inner pipe 2, 3. In addition, the drill pipe can be easily disassembled again, for example for maintenance. To protect the cavity 13 or to protect components located in the cavity 13, clamping rings 19, 20 are provided that seal the cavity relative to the drill pipe environment and the interior space of the drill pipe 1.

FIG. 3 shows a second detail of FIG. 1 in the region of the transition from the center region 8 to the box region 6. The device 9 for producing a galvanically-conducting connection is in this case arranged directly on the inner pipe 3. A conductor that is directed into the interior of the inner pipe 3 (not shown) connects to the strip conductor 12, which conductor leads to the device 9. The inner pipe 3 has an internal thread 21 and an external thread 22 on its box-side end. Via the external thread 22, the inner pipe 3 is connected to the outer pipe 2 by friction via a second mounting ring 23 and clamping rings 30, 31 analogously to the pin region 7. A protective sleeve 24 is screwed into the internal thread 21 of the inner pipe 3. The protective sleeve 24 protects the device 9 for producing a galvanically-conducting connection as well as the transition from the device 9 to the inner pipe 3. This protection is important since it can result in forming a spark during the production of a galvanically-conducting connection. This should be produced in particular when the drill string is used for oil, natural gas, or geothermal drilling, in any case in a space that is completely sealed relative to the drill string environment and the interior of the drill string, since starting at a certain drilling depth, small gas accumulations can occur at any time that could be caused to explode by a spark. A spring-loaded movable pressure plate 25 protects the device 9 on the box side. With respect to the front side of the drill pipe 1, the device 9 is sealed by an inner sealing group 26 between the protective sleeve 24 and the pressure plate 25 and an outer sealing group 27 between the pressure plate 25 and the outer pipe 2. In addition, an O-ring 28 is located between the protective ring 25 and the outer pipe 2 as a compression element for pressure compensation against residual fluid. The device 9 is sealed with respect to the cavity 13 by the two clamping rings 30, 31, which are clamped between a stop 29 and the mounting ring 23. Both simultaneously seal the cavity 13 itself.

The invention claimed is:

1. A drill pipe, comprising:
    an outer pipe;
    an inner pipe;
    a female connector with an internal thread on one end of the drill pipe; and
    a male connector with an external thread on an end of the drill pipe opposite to the female connector, wherein
    the inner pipe is arranged essentially concentrically in the outer pipe,
    the drill pipe has a center region with an inner diameter, the outer pipe has a thickening of a wall thickness inward with a smaller inner diameter on an end region on the male connector side relative to the inner diameter of the center region, the inner diameter of the outer pipe remains essentially the same on an end region on the female connector side relative to the inner diameter of the center region, and the inner pipe has a thickening of a wall thickness inward with a smaller inner diameter on the end region on the female connector side relative to the inner diameter of the center region.

2. The drill pipe according to claim 1, wherein the inner diameter of the inner pipe in the region of the thickening inward on the female connector side essentially corresponds to the inner diameter of the outer pipe in the region of the thickening inward on the male connector side.

3. The drill pipe according to claim 1, wherein the outer pipe on both ends has a thickening of the wall thickness outward.

4. The drill pipe according to claim 1, wherein the inner pipe at least in places on an outer side has at least one strip conductor.

5. The drill pipe according to claim 1, wherein the inner pipe is separated from the outer pipe at least in places and in this case forms a ring-shaped cavity.

6. The drill pipe according to claim 5, wherein a filler is located in the cavity.

7. The drill pipe according to claim 5, wherein a data medium is located in the cavity.

8. The drill pipe according to claim 5, wherein at least one sensor is located in the cavity.

9. The drill pipe according to claim 5, wherein the cavity is sealed relative to the environment and the interior space of the drill pipe.

10. The drill pipe according to claim 1, wherein the inner pipe can be inserted into the outer pipe only on one end of the outer pipe on the female connector side.

11. The drill pipe according to claim 10, wherein the inner pipe is connected to an end of the outer pipe on the female connector side in a removable manner with the latter.

12. The drill pipe according to claim 1, wherein the inner pipe at least in places on an outer side has two strip conductors.

13. The drill pipe according to claim 1, wherein the drill pipe is for a drill string.

* * * * *